United States Patent
Hu et al.

(10) Patent No.: US 10,827,517 B2
(45) Date of Patent: Nov. 3, 2020

(54) TRANSMISSION METHOD, MOBILE COMMUNICATION TERMINAL, AND NETWORK SIDE DEVICE

(71) Applicants: China Mobile Communication Ltd., Research Institute, Beijing (CN); China Mobile Communications Corporation, Beijing (CN)

(72) Inventors: Lijie Hu, Beijing (CN); Xueying Hou, Beijing (CN); Jing Dong, Beijing (CN)

(73) Assignees: China Mobile Communication Ltd., Research Institute, Beijing (CN); China Mobile Communications Corporation, Beijing (CN)

( * ) Notice: Subject to any disclaimer, the term of this patent is extended or adjusted under 35 U.S.C. 154(b) by 74 days.

(21) Appl. No.: 16/318,335

(22) PCT Filed: Sep. 26, 2017

(86) PCT No.: PCT/CN2017/103309
§ 371 (c)(1),
(2) Date: Jan. 16, 2019

(87) PCT Pub. No.: WO2018/059370
PCT Pub. Date: Apr. 5, 2018

(65) Prior Publication Data
US 2019/0246413 A1    Aug. 8, 2019

(30) Foreign Application Priority Data
Sep. 30, 2016 (CN) .......................... 2016 1 0875864

(51) Int. Cl.
*H04W 72/12* (2009.01)
*H04W 72/14* (2009.01)
*H04W 72/04* (2009.01)

(52) U.S. Cl.
CPC ....... *H04W 72/1268* (2013.01); *H04W 72/04* (2013.01); *H04W 72/14* (2013.01)

(58) Field of Classification Search
CPC ..... H04J 1/00; H04W 72/042; H04W 56/001; H04W 72/00; H04L 1/1861; H04L 5/0048
See application file for complete search history.

(56) References Cited

U.S. PATENT DOCUMENTS

| 2009/0010240 A1* | 1/2009 | Papasakellariou .... H04L 5/0091 370/344 |
| 2012/0026963 A1* | 2/2012 | Kim ...................... H04L 1/1896 370/329 |

(Continued)

FOREIGN PATENT DOCUMENTS

WO    WO 2015/045234 A1    4/2015

OTHER PUBLICATIONS

R1-160426, 3GPP TSG RAN WG1 Meeting #84, St. Julian's, Malta, Feb. 15-19, 2016, Agenda Item 7.3.1.5, 3 pages.

(Continued)

*Primary Examiner* — Iqbal Zaidi
(74) *Attorney, Agent, or Firm* — Morgan, Lewis & Bockius LLP

(57) ABSTRACT

A transmission method, a mobile communication terminal and a network side device are provided. The transmission method includes: receiving uplink grant information transmitted from a network side device; determining a subframe offset value in accordance with a first subframe number of a reference subframe where the uplink grant information is located, an UL/DL configuration of a current frame structure, and a processing time capability of a user; determining a target subframe, the target subframe being an uplink subframe or a special subframe, a difference between a second subframe number of the target subframe and the first (Continued)

subframe number being equal to the subframe offset value; and transmitting a PUSCH within the target subframe.

6 Claims, 8 Drawing Sheets

(56) References Cited

U.S. PATENT DOCUMENTS

2015/0003351 A1* 1/2015 Park .................. H04L 5/0044
370/329
2016/0143032 A1   5/2016 Horiuchi

OTHER PUBLICATIONS

Japanese Office Action dated Jan. 24, 2020 for JP 2019-517298, 3 pages.
English translation of Japanese Office Action dated Jan. 24, 2020 for JP 2019-517298, 3 pages.
R1-1609297, 3GPP TSG RAN WG1 Meeting #86bis, Lisbon, Portugal, Oct. 10-14, 2016, Agenda item 7.2.7, 8 pages.
R1-1612176, 3GPP TSG RAN WG1 Meeting #87, Reno, USA, Nov. 14-18, 2016, Agenda item 6.2.7, 4 pages.
R1-1612177, 3GPP TSG RAN WG1 Meeting #87, Reno, USA, Nov. 14-18, 2016, Agenda item 6.2.10.1, 6 pages.
R1-166145, 3GPP TSG RAN WG1 Meeting #86, Gothenburg, Sweden, Aug. 22-26, 2016, Agenda item 7.2.9, 2 pages.
R1-166294, 3GPP TSG RAN WG1 Meeting #86, Gothenburg, Sweden, Aug. 22-26, 2016, Agenda item 7.2.9, 8 pages.
R1-168098, 3GPP TSG RAN WG1 Meeting #86, Gothenburg, Sweden, Aug. 22-26, 2016, Agenda item 7.2.9, 4 pages.
Extended European Search Report dated Apr. 23, 2020 for Application No. 17854520.2, 15 pages.
Release 14, 3GPP TS 36.211 V14.0.0, server date Sep. 29, 2016, downloaded by EPO on Sep. 29, 2016, 60 pages.

* cited by examiner

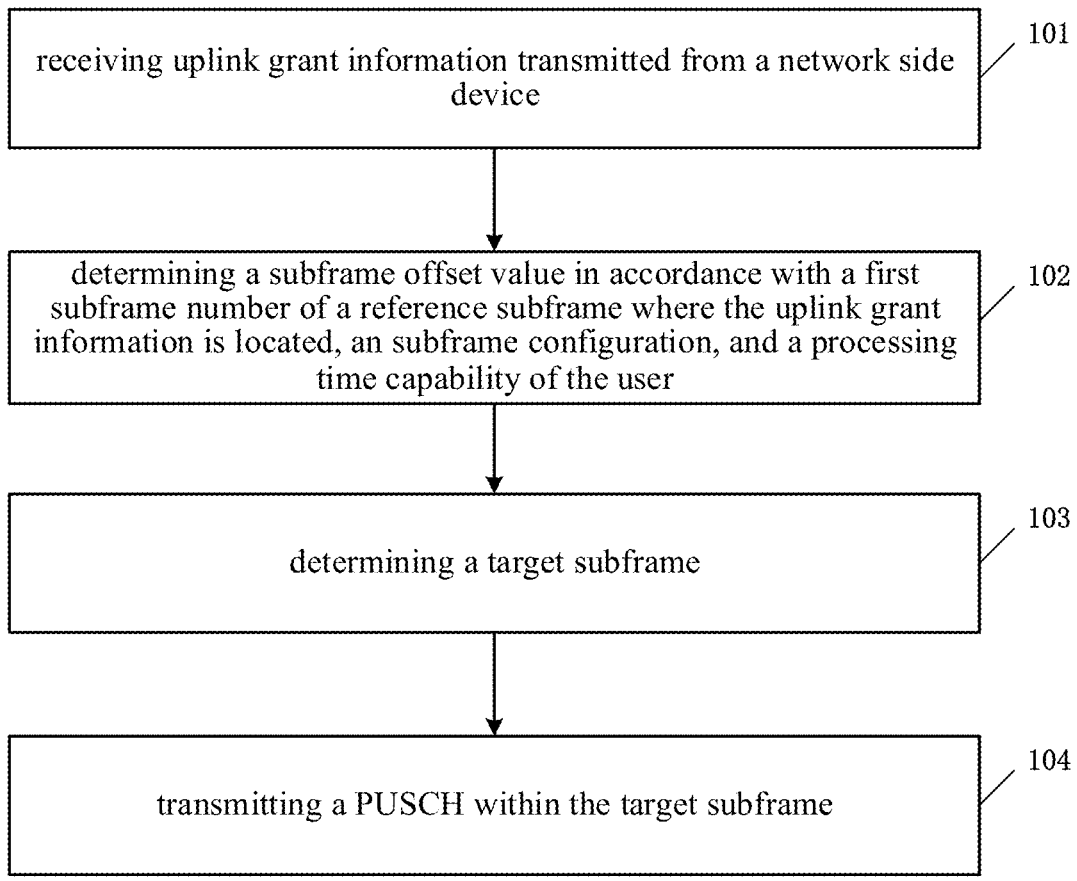

| 8 | 9 | 0 | 1 | 2 | 3 | 4 | 5 | 6 | 7 | 8 | 9 | 0 | 1 | 2 |
|---|---|---|---|---|---|---|---|---|---|---|---|---|---|---|
| D | D | D | S | U | D | D | D | D | D | D | D | D | S | U |
|   |   |   |   |   |   |   |   |   |   |   |   |   |   |   |
|   |   |   |   |   |   |   |   |   |   |   |   |   |   |   |

Fig.3q

| 9 | 0 | 1 | 2 | 3 | 4 | 5 | 6 | 7 | 8 | 9 | 0 | 1 | 2 | 3 | 4 |
|---|---|---|---|---|---|---|---|---|---|---|---|---|---|---|---|
| D | D | S | U | U | U | D | S | U | U | D | D | S | U | U | U |

Fig.3r

| 9 | 0 | 1 | 2 | 3 | 4 | 5 | 6 | 7 | 8 | 9 | 0 | 1 | 2 | 3 | 4 |
|---|---|---|---|---|---|---|---|---|---|---|---|---|---|---|---|
| D | D | S | U | U | U | D | S | U | U | D | D | S | U | U | U |

Fig.3s ures having an equal length are adopted by a Time Division Long Term Evolution (TD-LTE) system. Each subframe has a length of 1 ms and includes two time slots each having a length of 0.5 ms. A radio frame includes 10 subframes, i.e., the radio frame has a length of 10 ms. A basic scheduling/Transport Time Interval (TTI) for the TD-LTE system has a length equal to one subframe, i.e., 1 ms. Correspondingly, a TTI interval between a TTI for feedback and a TTI for data transmission needs to be set in accordance with such factors as a data transmission time delay and a data processing time period of a device, and usually, this interval has a length of 4 TTIs. In addition, a special subframe has been introduced into the TD-LTE system. The special subframe consists of a Downlink Pilot Time Slot (DwPTS), a Guard Period (GP), and an Uplink Pilot Time Slot (UpPTS).

TRANSMISSION METHOD, MOBILE COMMUNICATION TERMINAL, AND NETWORK SIDE DEVICE

CROSS-REFERENCE TO RELATED APPLICATION

The present application is the U.S. national phase of PCT Application No. PCT/CN2017/103309 filed on Sep. 26, 2017, which claims a priority of the Chinese patent application No. 201610875864.7 filed on Sep. 30, 2016, which are incorporated herein by reference in their entireties.

TECHNICAL FIELD

The present disclosure relates to the field of mobile communication technology, in particular to a transmission method, a mobile communication terminal and a network side device, so as to schedule a Physical Uplink Shared Channel (PUSCH) including an Uplink Pilot Time Slot (UpPTS) within a short time interval in accordance with uplink grant information.

BACKGROUND

Subframe structures having an equal length are adopted by a Time Division Long Term Evolution (TD-LTE) system. Each subframe has a length of 1 ms and includes two time slots each having a length of 0.5 ms. A radio frame includes 10 subframes, i.e., the radio frame has a length of 10 ms. A basic scheduling/Transport Time Interval (TTI) for the TD-LTE system has a length equal to one subframe, i.e., 1 ms. Correspondingly, a TTI interval between a TTI for feedback and a TTI for data transmission needs to be set in accordance with such factors as a data transmission time delay and a data processing time period of a device, and usually, this interval has a length of 4 TTIs. In addition, a special subframe has been introduced into the TD-LTE system. The special subframe consists of a Downlink Pilot Time Slot (DwPTS), a Guard Period (GP), and an Uplink Pilot Time Slot (UpPTS).

Currently, special subframe configurations for a TDD frame structure include special subframe configurations 0 to 9 defined in the $3^{rd}$-Generation Partnership Project (3GPP) Technical Specification (TS) 36.211, and no uplink signaling and data are transmitted within the UpPTS. Hybrid Automatic Repeat reQuest (HARQ), as a combination of Automatic Repeat reQuest (ARQ) and Forward Error Correction (FEC), is a link adaption technique for the LTE system.

An N-channel stop-and-wait HARQ protocol is adopted by the LTE system, i.e., there are N processes concurrently. The transmission is performed in each process through a stop-and-wait ARQ protocol, and after the transmission of one data packet, a transmitting end stops temporarily and waits for a confirmation message from a receiving end. When the data packet is received by the receiving end, error detection is performed on the data packet. When the data packet has been received correctly, an Acknowledgement (ACK) message is transmitted to the transmitting end, and otherwise, a Negative ACK (NACK) message is transmitted to the transmitting end. Upon the receipt of the ACK message, the transmitting end transmits a new data packet, and otherwise the previous data packet is retransmitted. Through the parallel N processes, it is able to perform the transmission in the other processes through channel resources during a stop-and-wait procedure.

For the TD-LTE system, a synchronous HARQ technique is adopted for an uplink, and the retransmission is performed within each subframe at a fixed time. However, the uplink transmission and the downlink transmission are performed in a time-division multiplexing manner, so it is impossible to provide a fixed, same feedback time interval for each subframe. For different Time-Division Duplexing (TDD) Uplink (UL)/Downlink (DL) configurations, the time interval for the scheduling of the uplink grant scheduling information, the time interval for the feedback of the ACK/NACK message, and the time interval for the retransmission are different from each other within different subframes.

However, along with the continuous improvement of the device processing capability, a processing time capability of a user may decrease continuously. In addition, because the PUSCH is capable of being transmitted within the UpPTS, a correspondence between the uplink grant and the scheduling of the PUSCH in the related art is not applicable any more. Hence, there is an urgent need to provide a new scheme so as to solve the above-mentioned problem.

SUMMARY

An object of the present disclosure is to provide a transmission method, a mobile communication terminal and a network side device, so as to schedule a PUSCH including an UpPTS within a short time interval in accordance with uplink grant information.

In one aspect, the present disclosure provides in some embodiments a transmission method for use in a mobile communication terminal, including: receiving uplink grant information transmitted from a network side device; determining a subframe offset value in accordance with a first subframe number of a reference subframe where the uplink grant information is located, an uplink/downlink configuration (UL/DL configuration) of a current frame structure, and a processing time capability of a user equipment, the processing time capability of the user equipment including the capability of at least 3 subframes or at least 2 subframes; determining a target subframe, the target subframe being an uplink subframe and/or a special subframe, a difference between a second subframe number of the target subframe and the first subframe number being equal to the subframe offset value; and transmitting a PUSCH within the target subframe.

In another aspect, the present disclosure provides in some embodiments a transmission method for use in a network side device, including: transmitting uplink grant information within a reference subframe having a first subframe number; and receiving a PUSCH within a target subframe, the target subframe being an uplink subframe or a special subframe, a difference between a second subframe number of the target subframe and the first subframe number being equal to a subframe offset value, and the subframe offset value being associated with the first subframe number, an UL/DL configuration of a current frame structure, and a processing time capability of a user.

In yet another aspect, the present disclosure provides in some embodiments a mobile communication terminal, including: a first reception module configured to receive uplink grant information transmitted from a network side device; a subframe offset determination module configured to determine a subframe offset value in accordance with a first subframe number of a reference subframe where the uplink grant information is located, an UL/DL configuration of a current frame structure, and a processing time capability of a user, the processing time capability of the user is the capability of at least 3 subframes or at least 2 subframes; a target subframe determination module configured to determine a target subframe, the target subframe being an uplink subframe and/or a special subframe, a difference between a second subframe number of the target subframe and the first subframe number being equal to the subframe offset value; and a first transmission module configured to transmit a PUSCH within the target subframe.

In still yet another aspect, the present disclosure provides in some embodiments a network side device, including: a second transmission module configured to transmit uplink grant information within a reference subframe having a first subframe number; and a second reception module configured to receive a PUSCH within a target subframe, the target subframe being an uplink subframe or a special subframe, a difference between a second subframe number of the target subframe and the first subframe number being equal to a subframe offset value, and the subframe offset value being associated with the first subframe number, an UL/DL configuration of a current frame structure, and a processing time capability of a user.

In still yet another aspect, the present disclosure provides in some embodiments a mobile communication terminal, including a processor, a memory and a transceiver. The processor is configured to read a program stored in the memory, so as to: receive uplink grant information transmitted from a network side device; determine a subframe offset value in accordance with a first subframe number of a reference subframe where the uplink grant information is located, an UL/DL configuration of a current frame structure, and a processing time capability of a user, the processing time capability of the user is the capability of at least 3 subframes or at least 2 subframes; determine a target subframe, the target subframe being an uplink subframe and/or a special subframe, a difference between a second subframe number of the target subframe and the first subframe number being equal to the subframe offset value; and transmit a PUSCH within the target subframe. The transceiver is configured to receive and transmit data. The memory is configured to store therein data for the operation of the processor.

In still yet another aspect, the present disclosure provides in some embodiments a network side device, including a processor, a memory and a transceiver. The processor is configured to read a program stored in the memory, so as to: transmit uplink grant information within a reference subframe having a first subframe number; and receive a PUSCH within a target subframe, the target subframe being an uplink subframe or a special subframe, a difference between a second subframe number of the target subframe and the first subframe number being equal to a subframe offset value, the subframe offset value being associated with the first subframe number, an UL/DL configuration of a current frame structure, and a processing time capability of a user, and the processing time capability of the user is the capability of at least 3 subframes or at least 2 subframes. The transceiver is configured to receive and transmit data. The memory is configured to store therein data for the operation of the processor.

In still yet another aspect, the present disclosure provides in some embodiments a computer-readable storage medium storing therein a computer program. The computer program is executed by a processor, so as to implement a transmission method for use in a mobile communication terminal including: receive uplink grant information transmitted from a network side device; determine a subframe offset value in accordance with a first subframe number of a reference subframe where the uplink grant information is located, an UL/DL configuration of a current frame structure, and a processing time capability of a user, and the processing time capability of the user is the capability of at least 3 subframes or at least 2 subframes; determine a target subframe, the target subframe being an uplink subframe or a special subframe, a difference between a second subframe number of the target subframe and the first subframe number being equal to the subframe offset value; and transmit a PUSCH within the target subframe.

In still yet another aspect, the present disclosure provides in some embodiments a computer-readable storage medium storing therein a computer program. The computer program is executed by a processor, so as to implement a transmission method for use in a network side device including: transmit uplink grant information within a reference subframe having a first subframe number; and receive a PUSCH within a target subframe, the target subframe being an uplink subframe or a special subframe, a difference between a second subframe number of the target subframe and the first subframe number being equal to a subframe offset value, the subframe offset value being associated with the first subframe number, an UL/DL configuration of a current frame structure, and a processing time capability of a user, and the processing time capability of the user is the capability of at least 3 subframes or at least 2 subframes.

According to the embodiments of the present disclosure, a correspondence among the subframe number of the reference subframe for the transmission of the uplink grant information, the subframe number of the target subframe for the transmission of the PUSCH, the UL/DL configurations and a processing time delay is reconstructed, and a PUSCH transmission capability of an UpPTS is taken into consideration. As a result, it is able to schedule the PUSCH including the UpPTS within a short time interval in accordance with the uplink grant information.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

FIG. 1 is a flow chart of a transmission method at a terminal side according to some embodiments of the present disclosure;

FIG. 2 is a schematic view showing settings corresponding to subframe configurations according to some embodiments of the present disclosure;

DETAILED DESCRIPTION OF THE EMBODIMENTS

Figure 3M:
FIGS. 3a-3s are sequence diagrams of respective configuration schemes according to some embodiments of the present disclosure.

In the following, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In the embodiments of the present disclosure, a correspondence among a subframe number of a reference subframe for the transmission of uplink grant information, a subframe number of a target subframe for the transmission of a PUSCH, UL/DL configurations and a processing time delay is reconstructed, and a PUSCH transmission capability of an UpPTS is taken into consideration. As a result, it is able to schedule the PUSCH including the UpPTS within a short time interval in accordance with the uplink grant information.

The present disclosure provides in some embodiments a transmission method for use in a mobile communication terminal which, as shown in FIG. 1, includes: Step 101 of receiving uplink grant information transmitted from a network side device; Step 102 of determining a subframe offset value in accordance with a first subframe number of a reference subframe where the uplink grant information is located, an UL/DL configuration of a current frame structure, and a processing time capability of a user, the processing time capability of the user is the capability of at least 3 subframes or at least 2 subframes; Step 103 of determining a target subframe, the target subframe being an uplink subframe or a special subframe, a difference between a second subframe number of the target subframe and the first subframe number being equal to the subframe offset value; and Step 104 of transmitting a PUSCH within the target subframe.

According to the transmission method in the embodiments of the present disclosure, a correspondence among the subframe number of the reference subframe for the transmission of the uplink grant information in a downlink control channel, the subframe number of the target subframe for the transmission of the PUSCH, the UL/DL configurations and a processing time delay is reconstructed, and a PUSCH transmission capability of an UpPTS is taken into consideration. As a result, it is able to schedule the PUSCH including the UpPTS within a short time interval in accordance with the uplink grant information.

As specified in the relevant standard, for different TDD UL/DL configurations and a conventional HARQ operation, it is necessary for a User Equipment (UE) to adjust the transmission of the PUSCH within a subframe n+k in accordance with a uplink Downlink Control Information (DCI) format (including the uplink grant information) carried in a Physical Downlink Control Channel (PDCCH)/Enhanced PDCCH (EPDCCH) transmitted within a subframe n or in accordance with the transmission of a detected Physical HARQ Indicator Channel (PHICH).

In the embodiments of the present disclosure, n represents the first subframe number, and k represents the subframe offset value.

As shown in FIG. 2, there are 7 UL/DL configurations, i.e., configuration 0 to configuration 6 in prior art. In the embodiments of the present disclosure, the processing time capability of the user is the capability of at least 3 subframes or at least 2 subframes. A correspondence between an uplink grant and the scheduled PUSCH will be described hereinafter with respect to various combinations of the 7 UL/DL configurations and the two processing time delays.

Before the description on the above correspondence, some criterions for the design of the above correspondence will be described briefly as follows. Criterion 1: uplink grants for uplink processes shall be carried in downlink subframes as many possible. Criterion 2: uplink grants as few as possible for the uplink processes shall be carried in each downlink subframe. Criterion 3: a time delay between the uplink grant and the scheduled PUSCH shall be as small as possible provided that the processing time has been met.

The embodiments of the present disclosure will be described in details as follows.

When the UL/DL configuration of the current frame structure is the configuration 0 and the processing time capability of the user is the capability of at least 3 subframes, there exists a following relationship between the first subframe number and the subframe offset value: when the first subframe number is 0, the subframe offset value is 3 and/or 4, when the first subframe number is 1, the subframe offset value is 6 and/or 5, when the first subframe number is 5, the subframe offset value is 3 and/or 4, and when the first subframe number is 6, the subframe offset value is 6 and/or 5; or when the first subframe number is 0, the subframe offset value is 3 and/or 6, when the first subframe number is 1, the subframe offset value is 3 and/or 6, when the first subframe number is 5, the subframe offset value is 3 and/or 6, and when the first subframe number is 6, the subframe offset value is 3 and/or 6.

As shown in Table 1 and Table 2, when two values of k are given for a certain first subframe number n, it is necessary to determine a to-be-scheduled uplink subframe corresponding to one of the two offset values in accordance with a value of an uplink (UL) index, so merely one of the two values may be taken as the value of k, and the other may correspond to the value of the UL index. Similarly, with respect to a UE without a time delay reduction capability in related art, in the UL/DL configuration 0, whether a PUSCH within a subframe n+k or a PUSCH within a subframe n+7 is scheduled may be determined in accordance with values of a Most Significant Bit (MSB) and a Least Significant Bit (LSB) of the UL index. Accordingly, for example, when a subframe offset value 3 of subframes 0 and 5 is called as the value of k, one value of the UL index may correspond to n+4, and another value of the UL index may correspond to both n+k and n+4 being scheduled simultaneously. The same may also be applied to the other first subframe numbers, as well as the tables involving the other UL/DL configurations and the other UE processing time capabilities.

TABLE 1

| | UL/DL configuration 0 | | | | | | | | | |
|---|---|---|---|---|---|---|---|---|---|---|
| | first subframe number (n) | | | | | | | | | |
| | 0 | 1 | 2 | 3 | 4 | 5 | 6 | 7 | 8 | 9 |
| subframe offset value (k) | 3, 4 | 6, 5 | | | | 3, 4 | 6, 5 | | | |

As shown in Table 1, two uplink processes are scheduled within each downlink subframe (including a DwPTS in a special time slot). In addition, for an uplink service channel which is to be transmitted early, a subframe for the corresponding uplink grant information may be transmitted early too. In other words, subframes 3 and 4 may be scheduled within a subframe 0, subframes 8 and 9 may be scheduled within a subframe 5, the PUSCHs within subframes 6 and 7 may be scheduled within a subframe 1, and the PUSCHs within subframes 1 and 2 may be scheduled within the subframe 6.

It is found that, in Table 1, each first subframe number corresponds to two initial subframe offset values, i.e., there is no unique relationship between the first subframe numbers and the subframe offset values. For each first subframe number, the PUSCH within one subframe or the PUSCHs within two subframes may probably be scheduled. At this time, in order to facilitate the scheduling by the UE, in a possible embodiment of the present disclosure, the determining the subframe offset value in accordance with the first subframe number of the reference subframe where the uplink grant information is located, the UL/DL configuration of the current frame structure, and the processing time capability of the user may include: selecting parts or all of the plurality of initial subframe offset values as the subframe offset value in accordance with a value of an uplink grant index field in the uplink grant information.

Detailed description will be given as follows.

The uplink grant index field includes two bits, i.e., the MSB and the LSB. When MSB=1 and LSB=0, it means that the terminal needs to adjust the transmission of the PUSCH within the subframe n+k in accordance with the uplink grant information within the subframe n (i.e., the subframe with the first subframe number). As shown in Table 1, the value of k corresponding to the subframes 0 and 5 is 3 or 4 in Table 4, and the value of k corresponding to the subframes 1 and 6 is 5 or 6.

When MSB=0 and LSB=1, it means that the terminal needs to adjust the transmission of the PUSCH within a subframe n+m in accordance with the uplink grant information within the subframe n (i.e., the subframe with the first subframe number). As shown in Table 1, a value of m corresponding to the subframes 0 and 5 is one of 3 and 4 that is different from the value of the k, and a value of m corresponding to the subframes 1 and 6 is one of 5 and 6 in Table 4 that is different from the value of k.

When MSB=1 and LSB=1, it means that the terminal needs to adjust the transmission of the PUSCHs within the subframe n+k and the subframe n+m in accordance with the uplink grant information within the subframe n (i.e., the subframe with the first subframe number). At this time, the resources for two PUSCHs may be scheduled simultaneously through one uplink grant.

A sequence of the above scheduling mode is shown in FIG. 3a, where totally seven processes are provided. In FIG. 3a, each box filled with oblique lines represents the uplink grant information, and each hatched box represents the PUSCH, which may also be applied to the other drawings.

The uplink processes may occur within the special subframe merely for a special subframe configuration 10, so it is necessary to preferentially ensure a minimum time delay from the uplink grant to the PUSCH within a normal subframe. At this time, two uplink processes may still be scheduled within each downlink subframe (including the DwPTS in the special time slot). In other words, the subframes 3 and 6 may be scheduled within the subframe 0, the subframes 8 and 1 may be scheduled within the subframe 5, the PUSCHs within the subframes 4 and 7 may be scheduled within the subframe 1, and the PUSCHs within the subframes 9 and 2 may be scheduled within the subframe 6.

Identically, the subframes to be scheduled may be determined in accordance with two bits of the uplink grant index field.

When MSB=1 and LSB=0, it means that the terminal needs to adjust the transmission of the PUSCH within the subframe n+k in accordance with the uplink grant information within the subframe n. The value of k corresponding to the subframes 0 and 5 is 3 or 6, and the value of k corresponding to the subframes 1 and 6 is 3 or 6.

When MSB=0 and LSB=1, it means that the terminal needs to adjust the transmission of the PUSCH within the subframe n+m in accordance with the uplink grant information within the subframe n. The value of m corresponding to the subframes 0 and 5 is one of 3 and 6 that is different from the value of the k, and the value of m corresponding to the subframes 1 and 6 is one of 3 and 6 that is different from the value of k.

When MSB=1 and LSB=1, it means that the terminal needs to adjust the transmission of the PUSCHs within the subframe n+k and the subframe n+m in accordance with the uplink grant information within the subframe n. At this time, the resources for two PUSCHs may be scheduled simultaneously.

Table 2 shows the relationship between the first subframe number and the subframe offset value for the above-mentioned second scheduling mode when a minimum time delay includes 3 subframes.

TABLE 2

| | UL/DL configuration | | | | | | | | | |
|---|---|---|---|---|---|---|---|---|---|---|
| | first subframe number | | | | | | | | | |
| | 0 | 1 | 2 | 3 | 4 | 5 | 6 | 7 | 8 | 9 |
| subframe offset value | 3, 6 | 3, 6 | | | | 3, 6 | 3, 6 | | | |

A sequence diagram corresponding to the above-mentioned scheduling mode is shown in FIG. 3b, where totally seven processes are included.

When the UL/DL configuration of the current frame structure is the configuration 1 and the processing time capability of the user is the capability of at least 3 subframes, there exists a following relationship between the first subframe number and the subframe offset value: when the first subframe number is 0, the subframe offset value is 3, when the first subframe number is 1, the subframe offset value is 5, when the first subframe number is 4, the subframe offset value is 3, when the first subframe number is 5, the subframe offset value is 3, when the first subframe number is 6, the subframe offset value is 5, and when the first subframe number is 9, the subframe offset value is 3, as shown in Table 3.

TABLE 3

| | UL/DL configuration 1 | | | | | | | | | |
|---|---|---|---|---|---|---|---|---|---|---|
| | first subframe number | | | | | | | | | |
| | 0 | 1 | 2 | 3 | 4 | 5 | 6 | 7 | 8 | 9 |
| subframe offset value | 3 | 5 | | | 3 | 3 | 5 | | | 3 |

A sequence diagram corresponding to the above-mentioned scheduling mode is shown in FIG. 3c, where totally five processes are included.

When the UL/DL configuration of the current frame structure is the configuration 2 and the processing time capability of the user is the capability of at least 3 subframes, there exists a following relationship between the first subframe number and the subframe offset value: when the first subframe number is 3, the subframe offset value is 3, when the first subframe number is 4, the subframe offset value is 3, when the first subframe number is 8, the subframe offset value is 3, and when the first subframe number is 9, the subframe offset value is 3, as shown in Table 4.

TABLE 4

UL/DL configuration 2

| | first subframe number | | | | | | | | | |
|---|---|---|---|---|---|---|---|---|---|---|
| | 0 | 1 | 2 | 3 | 4 | 5 | 6 | 7 | 8 | 9 |
| subframe offset value | | | | | 3 | 3 | | | 3 | 3 |

A sequence diagram corresponding to the above-mentioned scheduling mode is shown in FIG. 3d, where totally four processes are included.

When the UL/DL configuration of the current frame structure is the configuration 3 and the processing time capability of the user is the capability of at least 3 subframes, there exists a following relationship between the first subframe number and the subframe offset value: when the first subframe number is 0, the subframe offset value is 3, when the first subframe number is 1, the subframe offset value is 3, when the first subframe number is 8, the subframe offset value is 3, and when the first subframe number is 9, the subframe offset value is 3, as shown in Table 5.

TABLE 5

UL/DL configuration 3

| | first subframe number | | | | | | | | | |
|---|---|---|---|---|---|---|---|---|---|---|
| | 0 | 1 | 2 | 3 | 4 | 5 | 6 | 7 | 8 | 9 |
| subframe offset value | 3 | 3 | | | | | | | 3 | 3 |

A sequence diagram corresponding to the above-mentioned scheduling mode is shown in FIG. 3e, where totally four processes are included.

When the UL/DL configuration of the current frame structure is the configuration 4 and the processing time capability of the user is the capability of at least 3 subframes, there exists a following relationship between the first subframe number and the subframe offset value: when the first subframe number is 0, the subframe offset value is 3, when the first subframe number is 8, the subframe offset value is 3, and when the first subframe number is 9, the subframe offset value is 3, as shown in Table 6.

TABLE 6

UL/DL configuration 4

| | first subframe number | | | | | | | | | |
|---|---|---|---|---|---|---|---|---|---|---|
| | 0 | 1 | 2 | 3 | 4 | 5 | 6 | 7 | 8 | 9 |
| subframe offset value | 3 | | | | | | | | 3 | 3 |

A sequence diagram corresponding to the above-mentioned scheduling mode is shown in FIG. 3f, where totally three processes are included.

When the UL/DL configuration of the current frame structure is the configuration 5 and the processing time capability of the user is the capability of at least 3 subframes, there exists a following relationship between the first subframe number and the subframe offset value: when the first subframe number is 8, the subframe offset value is 3, and when the first subframe number is 9, the subframe offset value is 3, as shown in Table 7.

TABLE 7

UL/DL configuration 5

| | first subframe number | | | | | | | | | |
|---|---|---|---|---|---|---|---|---|---|---|
| | 0 | 1 | 2 | 3 | 4 | 5 | 6 | 7 | 8 | 9 |
| subframe offset value | | | | | | | | | 3 | 3 |

A sequence diagram corresponding to the above-mentioned scheduling mode is shown in FIG. 3f, where totally two processes are included.

When the UL/DL configuration of the current frame structure is the configuration 6 and the processing time capability of the user is the capability of at least 3 subframes, there exists a following relationship between the first subframe number and the subframe offset value: when the first subframe number is 0, the subframe offset value is 4, when the first subframe number is 1, the subframe offset value is 6 and/or 5, when the first subframe number is 5, the subframe offset value is 3, when the first subframe number is 6, the subframe offset value is 6 and/or 5, and when the first subframe number is 9, the subframe offset value is 4, as shown in Table 8; or when the first subframe number is 0, the subframe offset value is 3 and/or 6, when the first subframe number is 1, the subframe offset value is 3 and/or 6, when the first subframe number is 5, the subframe offset value is 3, when the first subframe number is 6, the subframe offset value is 5, and when the first subframe number is 9, the subframe offset value is 3, as shown in Table 9.

TABLE 8

UL/DL configuration 6

| | first subframe number | | | | | | | | | |
|---|---|---|---|---|---|---|---|---|---|---|
| | 0 | 1 | 2 | 3 | 4 | 5 | 6 | 7 | 8 | 9 |
| subframe offset value | 4 | 6, 5 | | | | 3 | 6, 5 | | | 4 |

In Table 8, the PUSCH within the special subframe and a normal uplink subframe following the special subframe are always scheduled simultaneously. At this time, the transmission of the PUSCHs may be scheduled within the subframes 6 and 7 merely in accordance with the uplink grant information within the subframe 1, and the transmission of the PUSCHs may be scheduled within the subframes 1 and 2 merely in accordance with the uplink grant information within the subframe 6.

TABLE 9

UL/DL configuration 6

| | first subframe number | | | | | | | | | |
|---|---|---|---|---|---|---|---|---|---|---|
| | 0 | 1 | 2 | 3 | 4 | 5 | 6 | 7 | 8 | 9 |
| subframe offset value | 3, 6 | 3, 6 | | | | 3 | 5 | | | 3 |

In Table 9, a small relative time delay is provided.

In Tables 8 and 9, the uplink subframe scheduled through the uplink grant information may also be determined in accordance with the uplink grant index field. In other words, parts or all of the plurality of initial subframe offset values may be selected as the subframe offset value in accordance with the value of the uplink grant index field in the uplink grant information.

Sequence diagrams corresponding to Tables 8 and 9 are shown in FIGS. 3h and 3i respectively.

When the UL/DL configuration of the current frame structure is the configuration 0 and the processing time capability of the user is the capability of at least 2 subframes, there exists a following relationship between the first subframe number and the subframe offset value: when the first subframe number is 0, the subframe offset value is 2 and/or 3, when the first subframe number is 1, the subframe offset value is 3 and/or 5, when the first subframe number is 5, the subframe offset value is 2 and/or 3, and when the first subframe number is 6, the subframe offset value is 3 and/or 5, as shown in Table 10; or when the first subframe number is 0, the subframe offset value is 2 and/or 6, when the first subframe number is 1, the subframe offset value is 2 and/or 3, when the first subframe number is 5, the subframe offset value is 2 and/or 6, and when the first subframe number is 6, the subframe offset value is 2 and/or 3, as shown in Table 11.

TABLE 10

| | UL/DL configuration 0 | | | | | | | | | |
|---|---|---|---|---|---|---|---|---|---|---|
| | first subframe number | | | | | | | | | |
| | 0 | 1 | 2 | 3 | 4 | 5 | 6 | 7 | 8 | 9 |
| subframe offset value | 2, 3 | 3, 5 | | | | 2, 3 | 3, 5 | | | |

TABLE 11

| | UL/DL configuration 0 | | | | | | | | | |
|---|---|---|---|---|---|---|---|---|---|---|
| | first subframe number | | | | | | | | | |
| | 0 | 1 | 2 | 3 | 4 | 5 | 6 | 7 | 8 | 9 |
| subframe offset value | 2, 6 | 2, 3 | | | | 2, 6 | 2, 3 | | | |

In Tables 10 and 11, the uplink subframe scheduled through the uplink grant information may also be determined in accordance with the uplink grant index field. In other words, parts or all of the plurality of initial subframe offset values may be selected as the subframe offset value in accordance with the value of the uplink grant index field in the uplink grant information.

Sequence diagrams corresponding to Tables 10 and 11 are shown in FIGS. 3j and 3k respectively.

When the UL/DL configuration of the current frame structure is the configuration 1 and the processing time capability of the user is the capability of at least 2 subframes, there exists a following relationship between the first subframe number and the subframe offset value: when the first subframe number is 0, the subframe offset value is 2, when the first subframe number is 1, the subframe offset value is 2, when the first subframe number is 4, the subframe offset value is 2, when the first subframe number is 5, the subframe offset value is 2, when the first subframe number is 6, the subframe offset value is 2, and when the first subframe number is 9, the subframe offset value is 2, as shown in Table 12.

TABLE 12

| | UL/DL configuration 1 | | | | | | | | | |
|---|---|---|---|---|---|---|---|---|---|---|
| | first subframe number | | | | | | | | | |
| | 0 | 1 | 2 | 3 | 4 | 5 | 6 | 7 | 8 | 9 |
| subframe offset value | 2 | 2 | | | 2 | 2 | 2 | | | 2 |

A sequence diagram corresponding to Table 12 is shown in FIG. 3l.

When the UL/DL configuration of the current frame structure is the configuration 2 and the processing time capability of the user is the capability of at least 2 subframes, there exists a following relationship between the first subframe number and the subframe offset value: when the first subframe number is 0, the subframe offset value is 2, when the first subframe number is 4, the subframe offset value is 2, when the first subframe number is 5, the subframe offset value is 2, and when the first subframe number is 9, the subframe offset value is 2, as shown in Table 13.

TABLE 13

| | UL/DL configuration 2 | | | | | | | | | |
|---|---|---|---|---|---|---|---|---|---|---|
| | first subframe number | | | | | | | | | |
| | 0 | 1 | 2 | 3 | 4 | 5 | 6 | 7 | 8 | 9 |
| subframe offset value | 2 | | | | 2 | 2 | | | | 2 |

A sequence diagram corresponding to Table 12 is shown in FIG. 3m.

When the UL/DL configuration of the current frame structure is the configuration 3 and the processing time capability of the user is the capability of at least 2 subframes, there exists a following relationship between the first subframe number and the subframe offset value: when the first subframe number is 0, the subframe offset value is 2, when the first subframe number is 1, the subframe offset value is 2 and/or 3, and when the first subframe number is 8, the subframe offset value is 3, as shown in Table 14; or when the first subframe number is 0, the subframe offset value is 2, when the first subframe number is 1, the subframe offset value is 2 and/or 3, and when the first subframe number is 9, the subframe offset value is 2, as shown in Table 15.

TABLE 14

UL/DL configuration 3

| | first subframe number | | | | | | | | | |
|---|---|---|---|---|---|---|---|---|---|---|
| | 0 | 1 | 2 | 3 | 4 | 5 | 6 | 7 | 8 | 9 |
| subframe offset value | 2 | 2, 3 | | | | | | | 3 | |

TABLE 15

UL/DL configuration 3

| | first subframe number | | | | | | | | | |
|---|---|---|---|---|---|---|---|---|---|---|
| | 0 | 1 | 2 | 3 | 4 | 5 | 6 | 7 | 8 | 9 |
| subframe offset value | 2 | 2, 3 | | | | | | | | 2 |

In Tables 14 and 15, the uplink subframe scheduled through the uplink grant information may also be determined in accordance with the uplink grant index field. In other words, parts or all of the plurality of initial subframe offset values may be selected as the subframe offset value in accordance with the value of the uplink grant index field in the uplink grant information.

Figure 3N:
Figure 3O:

Sequence diagrams corresponding to Tables 14 and 15 are shown in FIGS. 3n and 3o respectively.

It should be appreciated that, in order to schedule the transmission within the subframes within a large time interval as possible, when the processing time capability of the user is the capability of at least 2 subframes, there may also exist the following relationship between the first subframe number and the subframe offset value: when the first subframe number is 0, the subframe offset value is 3, when the first subframe number is 1, the subframe offset value is 3, when the first subframe number is 8, the subframe offset value is 3, and when the first subframe number is 9, the subframe offset value is 3, as shown in Table 5. The sequence diagram corresponding to Table 5 is shown in FIG. 3e, and thus will not be particularly defined herein.

When the UL/DL configuration of the current frame structure is the configuration 4 and the processing time capability of the user is the capability of at least 2 subframes, there exists a following relationship between the first subframe number and the subframe offset value: when the first subframe number is 0, the subframe offset value is 2, when the first subframe number is 1, the subframe offset value is 2, and when the first subframe number is 9, the subframe offset value is 2, as shown in Table 16.

TABLE 16

UL/DL configuration 4

| | first subframe number | | | | | | | | | |
|---|---|---|---|---|---|---|---|---|---|---|
| | 0 | 1 | 2 | 3 | 4 | 5 | 6 | 7 | 8 | 9 |
| subframe offset value | 2 | 2 | | | | | | | | 2 |

Figure 3P:

A sequence diagram corresponding to Table 16 is shown in FIG. 3p.

When the UL/DL configuration of the current frame structure is the configuration 5 and the processing time capability of the user is the capability of at least 2 subframes, there exists a following relationship between the first subframe number and the subframe offset value: when the first subframe number is 0, the subframe offset value is 2, and when the first subframe number is 9, the subframe offset value is 2, as shown in Table 17.

TABLE 17

UL/DL configuration 5

| | first subframe number | | | | | | | | | |
|---|---|---|---|---|---|---|---|---|---|---|
| | 0 | 1 | 2 | 3 | 4 | 5 | 6 | 7 | 8 | 9 |
| subframe offset value | 2 | | | | | | | | | 2 |

A sequence diagram corresponding to Table 17 is shown in FIG. 3q.

When the UL/DL configuration of the current frame structure is the configuration 6 and the processing time capability of the user is the capability of at least 2 subframes, there exists a following relationship between the first subframe number and the subframe offset value: when the first subframe number is 0, the subframe offset value is 2 and/or 6, when the first subframe number is 1, the subframe offset value is 2 and/or 3, when the first subframe number is 5, the subframe offset value is 2, when the first subframe number is 6, the subframe offset value is 2, and when the first subframe number is 9, the subframe offset value is 2, as shown in Table 18; or when the first subframe number is 0, the subframe offset value is 2 and/or 3, when the first subframe number is 1, the subframe offset value is 3 and/or 5, when the first subframe number is 5, the subframe offset value is 2, when the first subframe number is 6, the subframe offset value is 2, and when the first subframe number is 9, the subframe offset value is 2, as shown in Table 19.

TABLE 18

UL/DL configuration 6

| | first subframe number | | | | | | | | | |
|---|---|---|---|---|---|---|---|---|---|---|
| | 0 | 1 | 2 | 3 | 4 | 5 | 6 | 7 | 8 | 9 |
| subframe offset value | 2, 6 | 2, 3 | | | | 2 | 2 | | | 2 |

TABLE 19

| | UL/DL configuration 6 | | | | | | | | | |
|---|---|---|---|---|---|---|---|---|---|---|
| | first subframe number | | | | | | | | | |
| | 0 | 1 | 2 | 3 | 4 | 5 | 6 | 7 | 8 | 9 |
| subframe offset value | 3, 2 | 3, 5 | | | | 2 | 2 | | | 2 |

In Tables 18 and 19, the uplink subframe scheduled through the uplink grant information may also be determined in accordance with the uplink grant index field. In other words, parts or all of the plurality of initial subframe offset values may be selected as the subframe offset value in accordance with the value of the uplink grant index field in the uplink grant information.

Sequence diagrams corresponding to Tables 18 and 19 are shown in FIGS. 3r and 3s respectively.

In the embodiments of the present disclosure, the quantities of the processes after the transmission of the PUSCH within the UpPTS are 5, 3, 2, 4, 3, 2 and 5 for the UL/DL configurations 0 to 6 respectively.

Figure 4:
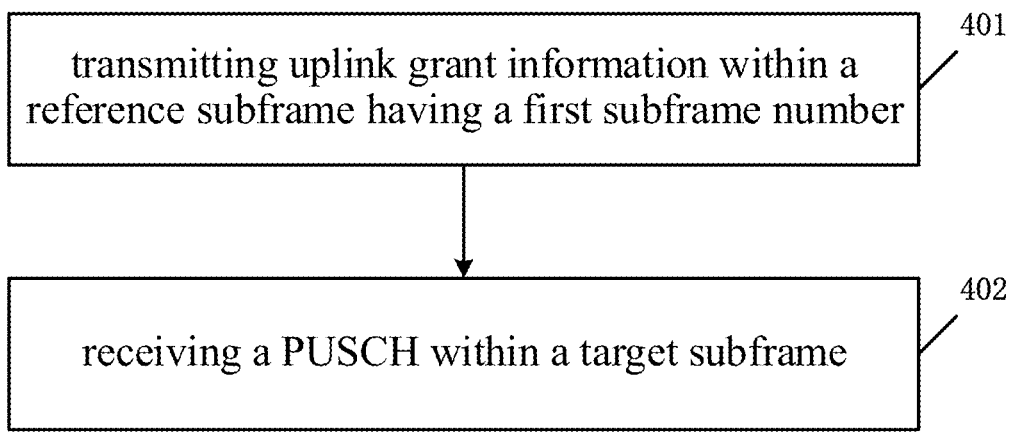
FIG. 4 is a flow chart of a transmission method at a network side according to some embodiments of the present disclosure.

The present disclosure further provides in some embodiments a transmission method at a network side which, as shown in FIG. 4, includes: Step 401 of transmitting uplink grant information within a reference subframe having a first subframe number; and Step 402 of receiving a PUSCH within a target subframe, the target subframe being an uplink subframe or a special subframe. A difference between a second subframe number of the target subframe and the first subframe number is equal to a subframe offset value, the subframe offset value is associated with the first subframe number, an UL/DL configuration of a current frame structure, and a processing time capability of a user, and the processing time capability of the user is the capability of at least 3 subframes or at least 2 subframes.

In the above transmission method, when the UL/DL configuration of the current frame structure is the configuration 0 and the processing time capability of the user is the capability of at least 3 subframes, there exists a following relationship between the first subframe number and the subframe offset value: when the first subframe number is 0, the subframe offset value is 3 and/or 4, when the first subframe number is 1, the subframe offset value is 6 and/or 5, when the first subframe number is 5, the subframe offset value is 3 and/or 4, and when the first subframe number is 6, the subframe offset value is 6 and/or 5; or when the first subframe number is 0, the subframe offset value is 3 and/or 6, when the first subframe number is 1, the subframe offset value is 3 and/or 6, when the first subframe number is 5, the subframe offset value is 3 and/or 6, and when the first subframe number is 6, the subframe offset value is 3 and/or 6.

In the above transmission method, when the UL/DL configuration of the current frame structure is the configuration 1 and the processing time capability of the user is the capability of at least 3 subframes, there exists a following relationship between the first subframe number and the subframe offset value: when the first subframe number is 0, the subframe offset value is 3, when the first subframe number is 1, the subframe offset value is 5, when the first subframe number is 4, the subframe offset value is 3, when the first subframe number is 5, the subframe offset value is 3, when the first subframe number is 6, the subframe offset value is 5, and when the first subframe number is 9, the subframe offset value is 3.

In the above transmission method, when the UL/DL configuration of the current frame structure is the configuration 2 and the processing time capability of the user is the capability of at least 3 subframes, there exists a following relationship between the first subframe number and the subframe offset value: when the first subframe number is 3, the subframe offset value is 3, when the first subframe number is 4, the subframe offset value is 3, when the first subframe number is 8, the subframe offset value is 3, and when the first subframe number is 9, the subframe offset value is 3.

In the above transmission method, when the UL/DL configuration of the current frame structure is the configuration 3 and the processing time capability of the user is the capability of at least 3 subframes, there exists a following relationship between the first subframe number and the subframe offset value: when the first subframe number is 0, the subframe offset value is 3, when the first subframe number is 1, the subframe offset value is 3, when the first subframe number is 8, the subframe offset value is 3, and when the first subframe number is 9, the subframe offset value is 3.

In the above transmission method, when the UL/DL configuration of the current frame structure is the configuration 4 and the processing time capability of the user is the capability of at least 3 subframes, there exists a following relationship between the first subframe number and the subframe offset value: when the first subframe number is 0, the subframe offset value is 3, when the first subframe number is 8, the subframe offset value is 3, and when the first subframe number is 9, the subframe offset value is 3.

In the above transmission method, when the UL/DL configuration of the current frame structure is the configuration 5 and the processing time capability of the user is the capability of at least 3 subframes, there exists a following relationship between the first subframe number and the subframe offset value: when the first subframe number is 8, the subframe offset value is 3, and when the first subframe number is 9, the subframe offset value is 3.

In the above transmission method, when the UL/DL configuration of the current frame structure is the configuration 6 and the processing time capability of the user is the capability of at least 3 subframes, there exists a following relationship between the first subframe number and the subframe offset value: when the first subframe number is 0, the subframe offset value is 4, when the first subframe number is 1, the subframe offset value is 6 and/or 5, when the first subframe number is 5, the subframe offset value is 3, when the first subframe number is 6, the subframe offset value is 6 and/or 5, and when the first subframe number is 9, the subframe offset value is 4; or when the first subframe number is 0, the subframe offset value is 3 and/or 6, when the first subframe number is 1, the subframe offset value is 3 and/or 6, when the first subframe number is 5, the subframe offset value is 3, when the first subframe number is 6, the subframe offset value is 5, and when the first subframe number is 9, the subframe offset value is 3.

In the above transmission method, when the UL/DL configuration of the current frame structure is the configuration 0 and the processing time capability of the user is the capability of at least 2 subframes, there exists a following relationship between the first subframe number and the subframe offset value: when the first subframe number is 0, the subframe offset value is 2 and/or 3, when the first subframe number is 1, the subframe offset value is 3 and/or 5, when the first subframe number is 5, the subframe offset value is 2 and/or 3, and when the first subframe number is 6, the subframe offset value is 3 and/or 5; or when the first subframe number is 0, the subframe offset value is 2 and/or 6, when the first subframe number is 1, the subframe offset value is 2 and/or 3, when the first subframe number is 5, the subframe offset value is 2 and/or 6, and when the first subframe number is 6, the subframe offset value is 2 and/or 3.

In the above transmission method, when the UL/DL configuration of the current frame structure is the configuration 1 and the processing time capability of the user is the capability of at least 2 subframes, there exists a following relationship between the first subframe number and the subframe offset value: when the first subframe number is 0, the subframe offset value is 2, when the first subframe number is 1, the subframe offset value is 2, when the first subframe number is 4, the subframe offset value is 2, when the first subframe number is 5, the subframe offset value is 2, when the first subframe number is 6, the subframe offset value is 2, and when the first subframe number is 9, the subframe offset value is 2.

In the above transmission method, when the UL/DL configuration of the current frame structure is the configuration 2 and the processing time capability of the user is the capability of at least 2 subframes, there exists a following relationship between the first subframe number and the subframe offset value: when the first subframe number is 0, the subframe offset value is 2, when the first subframe number is 4, the subframe offset value is 2, when the first subframe number is 5, the subframe offset value is 2, and when the first subframe number is 9, the subframe offset value is 2.

In the above transmission method, when the UL/DL configuration of the current frame structure is the configuration 3 and the processing time capability of the user is the capability of at least 2 subframes, there exists a following relationship between the first subframe number and the subframe offset value: when the first subframe number is 0, the subframe offset value is 2, when the first subframe number is 1, the subframe offset value is 2 and/or 3, and when the first subframe number is 8, the subframe offset value is 3; or when the first subframe number is 0, the subframe offset value is 2, when the first subframe number is 1, the subframe offset value is 2 and/or 3, and when the first subframe number is 9, the subframe offset value is 2.

In the above transmission method, when the UL/DL configuration of the current frame structure is the configuration 4 and the processing time capability of the user is the capability of at least 2 subframes, there exists a following relationship between the first subframe number and the subframe offset value: when the first subframe number is 0, the subframe offset value is 2, when the first subframe number is 1, the subframe offset value is 2, and when the first subframe number is 9, the subframe offset value is 2.

In the above transmission method, when the UL/DL configuration of the current frame structure is the configuration 5 and the processing time capability of the user is the capability of at least 2 subframes, there exists a following relationship between the first subframe number and the subframe offset value: when the first subframe number is 0, the subframe offset value is 2, and when the first subframe number is 9, the subframe offset value is 2.

In the above transmission method, when the UL/DL configuration of the current frame structure is the configuration 6 and the processing time capability of the user is the capability of at least 2 subframes, there exists a following relationship between the first subframe number and the subframe offset value: when the first subframe number is 0, the subframe offset value is 2 and/or 6, when the first subframe number is 1, the subframe offset value is 2 and/or 3, when the first subframe number is 5, the subframe offset value is 2, when the first subframe number is 6, the subframe offset value is 2, and when the first subframe number is 9, the subframe offset value is 2; or when the first subframe number is 0, the subframe offset value is 2 and/or 3, when the first subframe number is 1, the subframe offset value is 3 and/or 5, when the first subframe number is 5, the subframe offset value is 2, when the first subframe number is 6, the subframe offset value is 2, and when the first subframe number is 9, the subframe offset value is 2.

In the above transmission method, when there is a plurality of initial subframe offset values corresponding to the first subframe number, the transmitting the uplink grant information within the reference subframe having the first subframe number includes: assigning a value to an uplink grant index field in the uplink grant information in accordance with the target subframe scheduled by uplink grant, so as to enable a mobile communication terminal to select parts or all of the plurality of initial subframe offset values as the subframe offset value for determining the target subframe in accordance with the value of the uplink grant index field in the uplink grant information.

Figure 5:
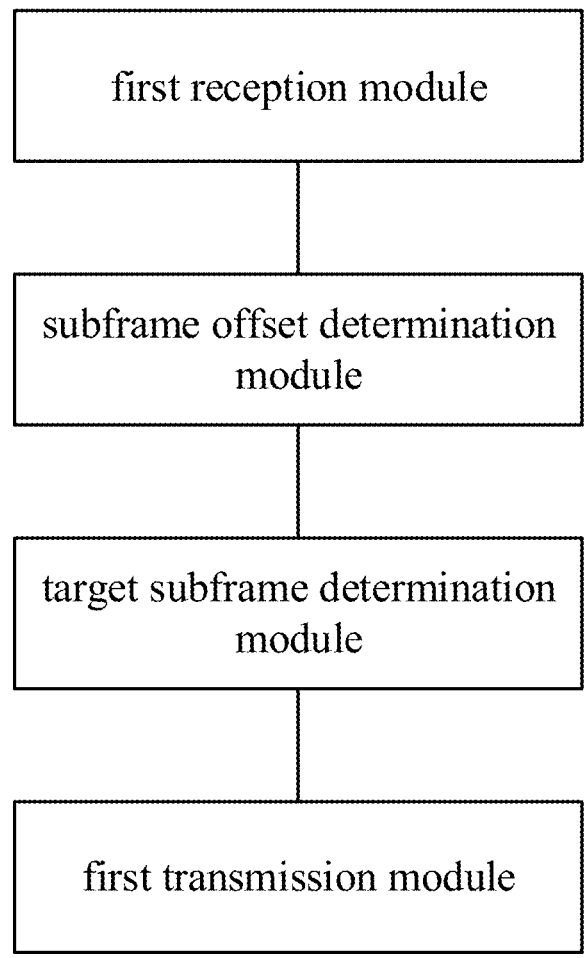
FIG. 5 is a schematic view showing a mobile communication terminal according to some embodiments of the present disclosure.

The present disclosure further provides in some embodiments a mobile communication terminal which as shown in FIG. 5, includes: a first reception module configured to receive uplink grant information transmitted from a network side device; a subframe offset determination module configured to determine a subframe offset value in accordance with a first subframe number of a reference subframe where the uplink grant information is located, an UL/DL configuration of a current frame structure, and a processing time capability of a user, the processing time capability of the user is the capability of at least 3 subframes or at least 2 subframes; a target subframe determination module configured to determine a target subframe, the target subframe being an uplink subframe and/or a special subframe, a difference between a second subframe number of the target subframe and the first subframe number being equal to the subframe offset value; and a first transmission module configured to transmit a PUSCH within the target subframe.

Figure 6:
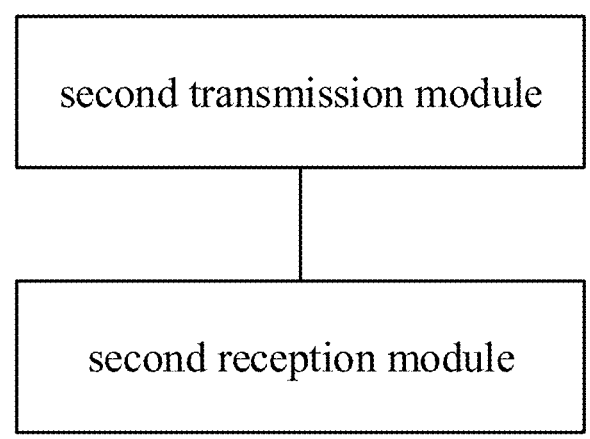
FIG. 6 is a schematic view showing a network side device according to some embodiments of the present disclosure.

The present disclosure further provides in some embodiments a network side device which, as shown in FIG. 6, includes: a second transmission module configured to transmit uplink grant information within a reference subframe having a first subframe number; and a second reception module configured to receive a PUSCH within a target subframe, the target subframe being an uplink subframe or a special subframe, a difference between a second subframe number of the target subframe and the first subframe number being equal to a subframe offset value, the subframe offset value being associated with the first subframe number, an UL/DL configuration of a current frame structure, and a processing time capability of a user, the processing time capability of the user is the capability of at least 3 subframes or at least 2 subframes.

For the above-mentioned mobile communication terminal and/or the above-mentioned network side device, when the UL/DL configuration of the current frame structure is the configuration 0 and the processing time capability of the user is the capability of at least 3 subframes, there exists a following relationship between the first subframe number and the subframe offset value: when the first subframe number is 0, the subframe offset value is 3 and/or 4, when the first subframe number is 1, the subframe offset value is 6 and/or 5, when the first subframe number is 5, the subframe offset value is 3 and/or 4, and when the first subframe number is 6, the subframe offset value is 6 and/or 5; or when the first subframe number is 0, the subframe offset value is 3 and/or 6, when the first subframe number is 1, the subframe offset value is 3 and/or 6, when the first subframe number is 5, the subframe offset value is 3 and/or 6, and when the first subframe number is 6, the subframe offset value is 3 and/or 6.

For the above-mentioned mobile communication terminal and/or the above-mentioned network side device, when the UL/DL configuration of the current frame structure is the configuration 1 and the processing time capability of the user is the capability of at least 3 subframes, there exists a following relationship between the first subframe number and the subframe offset value: when the first subframe number is 0, the subframe offset value is 3, when the first subframe number is 1, the subframe offset value is 5, when the first subframe number is 4, the subframe offset value is 3, when the first subframe number is 5, the subframe offset value is 3, when the first subframe number is 6, the subframe offset value is 5, and when the first subframe number is 9, the subframe offset value is 3.

For the above-mentioned mobile communication terminal and/or the above-mentioned network side device, when the UL/DL configuration of the current frame structure is the configuration 2 and the processing time capability of the user is the capability of at least 3 subframes, there exists a following relationship between the first subframe number and the subframe offset value: when the first subframe number is 3, the subframe offset value is 3, when the first subframe number is 4, the subframe offset value is 3, when the first subframe number is 8, the subframe offset value is 3, and when the first subframe number is 9, the subframe offset value is 3.

For the above-mentioned mobile communication terminal and/or the above-mentioned network side device, when the UL/DL configuration of the current frame structure is the configuration 3 and the processing time capability of the user is the capability of at least 3 subframes, there exists a following relationship between the first subframe number and the subframe offset value: when the first subframe number is 0, the subframe offset value is 3, when the first subframe number is 1, the subframe offset value is 3, when the first subframe number is 8, the subframe offset value is 3, and when the first subframe number is 9, the subframe offset value is 3.

For the above-mentioned mobile communication terminal and/or the above-mentioned network side device, when the UL/DL configuration of the current frame structure is the configuration 4 and the processing time capability of the user is the capability of at least 3 subframes, there exists a following relationship between the first subframe number and the subframe offset value: when the first subframe number is 0, the subframe offset value is 3, when the first subframe number is 8, the subframe offset value is 3, and when the first subframe number is 9, the subframe offset value is 3.

For the above-mentioned mobile communication terminal and/or the above-mentioned network side device, when the UL/DL configuration of the current frame structure is the configuration 5 and the processing time capability of the user is the capability of at least 3 subframes, there exists a following relationship between the first subframe number and the subframe offset value: when the first subframe number is 8, the subframe offset value is 3, and when the first subframe number is 9, the subframe offset value is 3.

For the above-mentioned mobile communication terminal and/or the above-mentioned network side device, when the UL/DL configuration of the current frame structure is the configuration 6 and the processing time capability of the user is the capability of at least 3 subframes, there exists a following relationship between the first subframe number and the subframe offset value: when the first subframe number is 0, the subframe offset value is 4, when the first subframe number is 1, the subframe offset value is 6 and/or 5, when the first subframe number is 5, the subframe offset value is 3, when the first subframe number is 6, the subframe offset value is 6 and/or 5, and when the first subframe number is 9, the subframe offset value is 4; or when the first subframe number is 0, the subframe offset value is 3 and/or 6, when the first subframe number is 1, the subframe offset value is 3 and/or 6, when the first subframe number is 5, the subframe offset value is 3, when the first subframe number is 6, the subframe offset value is 5, and when the first subframe number is 9, the subframe offset value is 3.

For the above-mentioned mobile communication terminal and/or the above-mentioned network side device, when the UL/DL configuration of the current frame structure is the configuration 0 and the processing time capability of the user is the capability of at least 2 subframes, there exists a following relationship between the first subframe number and the subframe offset value: when the first subframe number is 0, the subframe offset value is 2 and/or 3, when the first subframe number is 1, the subframe offset value is 3 and/or 5, when the first subframe number is 5, the subframe offset value is 2 and/or 3, and when the first subframe number is 6, the subframe offset value is 3 and/or 5; or when the first subframe number is 0, the subframe offset value is 2 and/or 6, when the first subframe number is 1, the subframe offset value is 2 and/or 3, when the first subframe number is 5, the subframe offset value is 2 and/or 6, and when the first subframe number is 6, the subframe offset value is 2 and/or 3.

For the above-mentioned mobile communication terminal and/or the above-mentioned network side device, when the UL/DL configuration of the current frame structure is the configuration 1 and the processing time capability of the user is the capability of at least 2 subframes, there exists a following relationship between the first subframe number and the subframe offset value: when the first subframe number is 0, the subframe offset value is 2, when the first subframe number is 1, the subframe offset value is 2, when the first subframe number is 4, the subframe offset value is 2, when the first subframe number is 5, the subframe offset value is 2, when the first subframe number is 6, the subframe offset value is 2, and when the first subframe number is 9, the subframe offset value is 2.

For the above-mentioned mobile communication terminal and/or the above-mentioned network side device, when the UL/DL configuration of the current frame structure is the configuration 2 and the processing time capability of the user is the capability of at least 2 subframes, there exists a following relationship between the first subframe number and the subframe offset value: when the first subframe number is 0, the subframe offset value is 2, when the first subframe number is 4, the subframe offset value is 2, when the first subframe number is 5, the subframe offset value is 2, and when the first subframe number is 9, the subframe offset value is 2.

For the above-mentioned mobile communication terminal and/or the above-mentioned network side device, when the UL/DL configuration of the current frame structure is the configuration 3 and the processing time capability of the user is the capability of at least 2 subframes, there exists a following relationship between the first subframe number and the subframe offset value: when the first subframe number is 0, the subframe offset value is 2, when the first subframe number is 1, the subframe offset value is 2 and/or 3, and when the first subframe number is 8, the subframe offset value is 3; or when the first subframe number is 0, the subframe offset value is 2, when the first subframe number is 1, the subframe offset value is 2 and/or 3, and when the first subframe number is 9, the subframe offset value is 2.

For the above-mentioned mobile communication terminal and/or the above-mentioned network side device, when the UL/DL configuration of the current frame structure is the configuration 4 and the processing time capability of the user is the capability of at least 2 subframes, there exists a following relationship between the first subframe number and the subframe offset value: when the first subframe number is 0, the subframe offset value is 2, when the first subframe number is 1, the subframe offset value is 2, and when the first subframe number is 9, the subframe offset value is 2.

For the above-mentioned mobile communication terminal and/or the above-mentioned network side device, when the UL/DL configuration of the current frame structure is the configuration 5 and the processing time capability of the user is the capability of at least 2 subframes, there exists a following relationship between the first subframe number and the subframe offset value: when the first subframe number is 0, the subframe offset value is 2, and when the first subframe number is 9, the subframe offset value is 2.

For the above-mentioned mobile communication terminal and/or the above-mentioned network side device, when the UL/DL configuration of the current frame structure is the configuration 6 and the processing time capability of the user is the capability of at least 2 subframes, there exists a following relationship between the first subframe number and the subframe offset value: when the first subframe number is 0, the subframe offset value is 2 and/or 6, when the first subframe number is 1, the subframe offset value is 2 and/or 3, when the first subframe number is 5, the subframe offset value is 2, when the first subframe number is 6, the subframe offset value is 2, and when the first subframe number is 9, the subframe offset value is 2; or when the first subframe number is 0, the subframe offset value is 2 and/or 3, when the first subframe number is 1, the subframe offset value is 3 and/or 5, when the first subframe number is 5, the subframe offset value is 2, when the first subframe number is 6, the subframe offset value is 2, and when the first subframe number is 9, the subframe offset value is 2.

It should be appreciated that, such terms as "include" or "including" and/or any other variations involved in the present disclosure intend to provide non-exclusive coverage, so that a procedure, method, article and/or device including a series of elements may also include any other elements not listed herein, and/or may include any inherent elements of the procedure, method, article and/or device. If without any further limitations, for the elements defined by such sentence as "including one . . . ", it is not excluded that the procedure, method, article and/or device including the elements may also include any other identical elements.

The serial numbers of the embodiments are for illustrative purposes only, but shall not be used to define that one embodiment is superior to the other.

Through the above-mentioned description, it may be apparent for a person skilled in the art that the methods of the embodiments may be implemented by software as well as a necessary common hardware platform, or by hardware, and the former may be better in most cases. Based on this, the technical solutions of the present disclosure, substantially, or parts of the technical solutions of the present disclosure contributing to the related art, may appear in the form of software products, which may be stored in a storage medium (e.g., Read-Only Memory (ROM)/Random Access Memory (RAM), magnetic disk or optical disk) and include several instructions so as to enable a terminal device (e.g., mobile phone, computer, server, air conditioner and/or network device) to execute the method in the embodiments of the present disclosure.

The above embodiments are for illustrative purposes only, but the present disclosure is not limited thereto. A person skilled in the art may make further modifications and improvements without departing from the spirit of the present disclosure, and these modifications and improvements shall also fall within the scope of the present disclosure. A protection scope of the present disclosure is defined by attached claims.

What is claimed is:

1. A transmission method for use in a mobile communication terminal, comprising:

receiving uplink grant information transmitted from a network side device;

determining a subframe offset value in accordance with a first subframe number of a reference subframe in which the uplink grant information is located, an uplink/downlink configuration (UL/DL configuration) of a current frame structure, and a processing time capability of a user, and the processing time capability of the user being a capability of at least 3 subframes or at least 2 subframes;

determining a target subframe, the target subframe being an uplink subframe or a special subframe, a difference between a second subframe number of the target subframe and the first subframe number being equal to the subframe offset value; and transmitting a Physical Uplink Shared Channel (PUSCH) within the target subframe, wherein the UL/DL configuration of the current frame structure is a configuration 0, a configuration 1, a configuration 2, a configuration 3, a configuration 4, a configuration 5, or a configuration 6, wherein the first subframe number is 0, 1, 5, or 6, when the UL/DL configuration of the current frame structure is a configuration 0 and the processing time capability of the user is the capability of at least 3 subframes, a relationship between the first subframe number and the subframe offset value is that:

when the first subframe number is 0, the subframe offset value is at least one of 3 and 4, when the first subframe number is 1, the subframe offset value is at least one of 6 and 5, when the first subframe number is 5, the subframe offset value is at least one of 3 and 4, and when the first subframe number is 6, the subframe offset value is at least one of 6 and 5; or when the first subframe number is 0, the subframe offset value is at least one of 3 and 6, when the first subframe number is 1, the subframe offset value is at least one of 3 and 6, when the first subframe number is 5, the subframe offset value is at least one of 3 and 6, and when the first subframe number is 6, the subframe offset value is at least one of 3 and 6;

or, wherein the first subframe number is 0, 1, 4, 5, 6, or 9, when the UL/DL configuration of the current frame structure is a configuration 1 and the processing time capability of the user is the capability of at least 3 subframes, a relationship between the first subframe number and the subframe offset value is that:

when the first subframe number is 0, the subframe offset value is 3, when the first subframe number is 1, the subframe offset value is 5, when the first subframe number is 4, the subframe offset value is 3, when the first subframe number is 5, the subframe offset value is 3, when the first subframe number is 6, the subframe offset value is 5, and when the first subframe number is 9, the subframe offset value is 3; or when the UL/DL configuration of the current frame structure is the configuration 1 and the processing time capability of the user is the capability of at least 2 subframes, a relationship between the first subframe number and the subframe offset value is that:

when the first subframe number is 0, the subframe offset value is 2, when the first subframe number is 1, the subframe offset value is 2, when the first subframe number is 4, the subframe offset value is 2, when the first subframe number is 5, the subframe offset value is 2, when the first subframe number is 6, the subframe offset value is 2, and when the first subframe number is 9, the subframe offset value is 2;

or, wherein when the UL/DL configuration of the current frame structure is a configuration 2 and the processing time capability of the user is the capability of at least 3 subframes, a relationship between the first subframe number and the subframe offset value is that:

when the first subframe number is 3, the subframe offset value is 3, when the first subframe number is 4, the subframe offset value is 3, when the first subframe number is 8, the subframe offset value is 3, and when the first subframe number is 9, the subframe offset value is 3, wherein the first subframe number is 3, 4, 8, or 9; or when the UL/DL configuration of the current frame structure is the configuration 2 and the processing time capability of the user is the capability of at least 2 subframes, a relationship between the first subframe number and the subframe offset value is that:

when the first subframe number is 0, the subframe offset value is 2, when the first subframe number is 4, the subframe offset value is 2, when the first subframe number is 5, the subframe offset value is 2, and when the first subframe number is 9, the subframe offset value is 2, wherein the first subframe number is 0, 4, 5, or 9;

or, wherein when the UL/DL configuration of the current frame structure is a configuration 3 and the processing time capability of the user is the capability of at least 3 subframes, a relationship between the first subframe number and the subframe offset value is that:

when the first subframe number is 0, the subframe offset value is 3, when the first subframe number is 1, the subframe offset value is 3, when the first subframe number is 8, the subframe offset value is 3, and when the first subframe number is 9, the subframe offset value is 3, wherein the first subframe number is 0, 1, 8, or 9; or when the UL/DL configuration of the current frame structure is the configuration 3 and the processing time capability of the user is the capability of at least 2 subframes, a relationship between the first subframe number and the subframe offset value is that:

when the first subframe number is 0, the subframe offset value is 2, when the first subframe number is 1, the subframe offset value is at least one of 2 and 3, and when the first subframe number is 8, the subframe offset value is 3, wherein the first subframe number is 0, 1, or 8; or when the first subframe number is 0, the subframe offset value is 2, when the first subframe number is 1, the subframe offset value is at least one of 2 and 3, and when the first subframe number is 9, the subframe offset value is 2, wherein the first subframe number is 0, 1, or 9; or when the first subframe number is 0, the subframe offset value is 3, when the first subframe number is 1, the subframe offset value is 3, when the first subframe number is 8, the subframe offset value is 3, and when the first subframe number is 9, the subframe offset value is 3, wherein the first subframe number is 0, 1, 8, or 9;

or, wherein when the UL/DL configuration of the current frame structure is a configuration 4 and the processing time capability of the user is the capability of at least 3 subframes, a relationship between the first subframe number and the subframe offset value is that:

when the first subframe number is 0, the subframe offset value is 3, when the first subframe number is 8, the subframe offset value is 3, and when the first subframe number is 9, the subframe offset value is 3, wherein the first subframe number is 0, 8, or 9; or when the UL/DL configuration of the current frame structure is the configuration 4 and the processing time capability of the user is the capability of at least 2 subframes, a relationship between the first subframe number and the subframe offset value is that:

when the first subframe number is 0, the subframe offset value is 2, when the first subframe number is 1, the subframe offset value is 2, and when the first subframe number is 9, the subframe offset value is 2, wherein the first subframe number is 0, 1, or 9;

or, wherein when the UL/DL configuration of the current frame structure is a configuration 5 and the processing time capability of the user is the capability of at least 3 subframes, a relationship between the first subframe number and the subframe offset value is that:

when the first subframe number is 8, the subframe offset value is 3, and when the first subframe number is 9, the subframe offset value is 3, wherein the first subframe number is 8 or 9; or when the UL/DL configuration of the current frame structure is the configuration 5 and the processing time capability of the user is the capability of at least 2 subframes, a relationship between the first subframe number and the subframe offset value is that:

when the first subframe number is 0, the subframe offset value is 2, and when the first subframe number is 9, the subframe offset value is 2 wherein the first subframe number is 0 or 9;
or,
wherein the first subframe number is 0, 1, 5, 6, or 9, when the UL/DL configuration of the current frame structure is a configuration 6 and the processing time capability of the user is the capability of at least 3 subframes, a relationship between the first subframe number and the subframe offset value is that:
when the first subframe number is 0, the subframe offset value is 4, when the first subframe number is 1, the subframe offset value is at least one of 6 and 5, when the first subframe number is 5, the subframe offset value is 3, when the first subframe number is 6, the subframe offset value is at least one of 6 and 5, and when the first subframe number is 9, the subframe offset value is 4; or
when the first subframe number is 0, the subframe offset value is at least one of 3 and 6, when the first subframe number is 1, the subframe offset value is at least one of 3 and 6, when the first subframe number is 5, the subframe offset value is 3, when the first subframe number is 6, the subframe offset value is 5, and when the first subframe number is 9, the subframe offset value is 3; or
when the UL/DL configuration of the current frame structure is the configuration 6 and the processing time capability of the user is the capability of at least 2 subframes, a relationship between the first subframe number and the subframe offset value is that:
when the first subframe number is 0, the subframe offset value is at least one of 2 and 6, when the first subframe number is 1, the subframe offset value is at least one of 2 and 3, when the first subframe number is 5, the subframe offset value is 2, when the first subframe number is 6, the subframe offset value is 2, and when the first subframe number is 9, the subframe offset value is 2; or
when the first subframe number is 0, the subframe offset value is at least one of 2 and 3, when the first subframe number is 1, the subframe offset value is at least one of 3 and 5, when the first subframe number is 5, the subframe offset value is 2, when the first subframe number is 6, the subframe offset value is 2, and when the first subframe number is 9, the subframe offset value is 2;
or,
wherein the first subframe number is 0, 1, 5, or 6, when the UL/DL configuration of the current frame structure is the configuration 0 and the processing time capability of the user is the capability of at least 2 subframes, a relationship between the first subframe number and the subframe offset value is that:
when the first subframe number is 0, the subframe offset value is at least one of 2 and 3,
when the first subframe number is 1, the subframe offset value is at least one of 3 and 5, when the first subframe number is 5, the subframe offset value is at least one of 2 and 3, and when the first subframe number is 6, the subframe offset value is at least one of 3 and 5; or
when the first subframe number is 0, the subframe offset value is at least one of 2 and 6, when the first subframe number is 1, the subframe offset value is at least one of 2 and 3, when the first subframe number is 5, the subframe offset value is at least one of 2 and 6, and when the first subframe number is 6, the subframe offset value is at least one of 2 and 3.

2. The transmission method according to claim 1, wherein the UL/DL configuration of the current frame structure is the configuration 0 and the processing time capability of the user is the capability of at least 3 subframes, a plurality of initial subframe offset values corresponding to the first subframe number is provided, and the determining the subframe offset value in accordance with the first subframe number of the reference subframe in which the uplink grant information is located, the UL/DL configuration of the current frame structure, and the processing time capability of the user comprises:
selecting parts or all of the plurality of initial subframe offset values as the subframe offset value in accordance with a value of an uplink grant index field in the uplink grant information.

3. A transmission method for use in a network side device, comprising:
transmitting uplink grant information within a reference subframe having a first subframe number; and
receiving a PUSCH within a target subframe, the target subframe being an uplink subframe or a special subframe, a difference between a second subframe number of the target subframe and the first subframe number being equal to a subframe offset value, the subframe offset value being associated with the first subframe number, an UL/DL configuration of a current frame structure, and a processing time capability of a user, and the processing time capability of the user being a capability of at least 3 subframes or at least 2 subframes,
wherein the UL/DL configuration of the current frame structure is a configuration 0, a configuration 1, a configuration 2, a configuration 3, a configuration 4, a configuration 5, or a configuration 6,
wherein the first subframe number is 0, 1, 5, or 6, when the UL/DL configuration of the current frame structure is a configuration 0 and the processing time capability of the user is the capability of at least 3 subframes, a relationship between the first subframe number and the subframe offset value is that:
when the first subframe number is 0, the subframe offset value is at least one of 3 and 4, when the first subframe number is 1, the subframe offset value is at least one of 6 and 5, when the first subframe number is 5, the subframe offset value is at least one of 3 and 4, and when the first subframe number is 6, the subframe offset value is at least one of 6 and 5; or
when the first subframe number is 0, the subframe offset value is at least one of 3 and 6, when the first subframe number is 1, the subframe offset value is at least one of 3 and 6, when the first subframe number is 5, the subframe offset value is at least one of 3 and 6, and when the first subframe number is 6, the subframe offset value is at least one of 3 and 6; or
when the UL/DL configuration of the current frame structure is the configuration 0 and the processing time capability of the user is the capability of at least 2 subframes, a relationship between the first subframe number and the subframe offset value is that:
when the first subframe number is 0, the subframe offset value is at least one of 2 and 3, when the first subframe number is 1, the subframe offset value is at least one of 3 and 5, when the first subframe number is 5, the subframe offset value is at least one of 2 and 3, and when the first subframe number is 6, the subframe offset value is at least one of 3 and 5; or when the first subframe number is 0, the subframe offset value is at least one of 2 and 6, when the first subframe number is 1, the subframe offset value is at least one of 2 and 3, when the first subframe number is 5, the subframe offset value is at least one of 2 and 6, and when the first subframe number is 6, the subframe offset value is at least one of 2 and 3;

or, wherein the first subframe number is 0, 1, 4, 5, 6, or 9, when the UL/DL configuration of the current frame structure is a configuration 1 and the processing time capability of the user is the capability of at least 3 subframes, a relationship between the first subframe number and the subframe offset value is that:

when the first subframe number is 0, the subframe offset value is 3, when the first subframe number is 1, the subframe offset value is 5, when the first subframe number is 4, the subframe offset value is 3, when the first subframe number is 5, the subframe offset value is 3, when the first subframe number is 6, the subframe offset value is 5, and when the first subframe number is 9, the subframe offset value is 3; or when the UL/DL configuration of the current frame structure is the configuration 1 and the processing time capability of the user is the capability of at least 2 subframes, a relationship between the first subframe number and the subframe offset value is that:

when the first subframe number is 0, the subframe offset value is 2, when the first subframe number is 1, the subframe offset value is 2, when the first subframe number is 4, the subframe offset value is 2, when the first subframe number is 5, the subframe offset value is 2, when the first subframe number is 6, the subframe offset value is 2, and when the first subframe number is 9, the subframe offset value is 2;

or, wherein when the UL/DL configuration of the current frame structure is a configuration 2 and the processing time capability of the user is the capability of at least 3 subframes, a relationship between the first subframe number and the subframe offset value is that:

when the first subframe number is 3, the subframe offset value is 3, when the first subframe number is 4, the subframe offset value is 3, when the first subframe number is 8, the subframe offset value is 3, and when the first subframe number is 9, the subframe offset value is 3, wherein the first subframe number is 3, 4, 8, or 9; or when the UL/DL configuration of the current frame structure is the configuration 2 and the processing time capability of the user is the capability of at least 2 subframes, a relationship between the first subframe number and the subframe offset value is that:

when the first subframe number is 0, the subframe offset value is 2, when the first subframe number is 4, the subframe offset value is 2, when the first subframe number is 5, the subframe offset value is 2, and when the first subframe number is 9, the subframe offset value is 2, wherein the first subframe number is 0, 4, 5, or 9;

or, wherein when the UL/DL configuration of the current frame structure is a configuration 3 and the processing time capability of the user is the capability of at least 3 subframes, a relationship between the first subframe number and the subframe offset value is that:

when the first subframe number is 0, the subframe offset value is 3, when the first subframe number is 1, the subframe offset value is 3, when the first subframe number is 8, the subframe offset value is 3, and when the first subframe number is 9, the subframe offset value is 3, wherein the first subframe number is 0, 1, 8, or 9; or when the UL/DL configuration of the current frame structure is the configuration 3 and the processing time capability of the user is the capability of at least 2 subframes, a relationship between the first subframe number and the subframe offset value is that:

when the first subframe number is 0, the subframe offset value is 2, when the first subframe number is 1, the subframe offset value is at least one of 2 and 3, and when the first subframe number is 8, the subframe offset value is 3, wherein the first subframe number is 0, 1, or 8; or when the first subframe number is 0, the subframe offset value is 2, when the first subframe number is 1, the subframe offset value is at least one of 2 and 3, and when the first subframe number is 9, the subframe offset value is 2, wherein the first subframe number is 0, 1, or 9; or when the first subframe number is 0, the subframe offset value is 3, when the first subframe number is 1, the subframe offset value is 3, when the first subframe number is 8, the subframe offset value is 3, and when the first subframe number is 9, the subframe offset value is 3, wherein the first subframe number is 0, 1, 8, or 9;

or, wherein when the UL/DL configuration of the current frame structure is a configuration 4 and the processing time capability of the user is the capability of at least 3 subframes, a relationship between the first subframe number and the subframe offset value is that:

when the first subframe number is 0, the subframe offset value is 3, when the first subframe number is 8, the subframe offset value is 3, and when the first subframe number is 9, the subframe offset value is 3, wherein the first subframe number is 0, 8, or 9; or when the UL/DL configuration of the current frame structure is the configuration 4 and the processing time capability of the user is the capability of at least 2 subframes, a relationship between the first subframe number and the subframe offset value is that:

when the first subframe number is 0, the subframe offset value is 2, when the first subframe number is 1, the subframe offset value is 2, and when the first subframe number is 9, the subframe offset value is 2, wherein the first subframe number is 0, 1, or 9;

or, wherein when the UL/DL configuration of the current frame structure is a configuration 5 and the processing time capability of the user is the capability of at least 3 subframes, a relationship between the first subframe number and the subframe offset value is that:

when the first subframe number is 8, the subframe offset value is 3, and when the first subframe number is 9, the subframe offset value is 3, wherein the first subframe number is 8 or 9; or when the UL/DL configuration of the current frame structure is the configuration 5 and the processing time capability of the user is the capability of at least 2 subframes, a relationship between the first subframe number and the subframe offset value is that:

when the first subframe number is 0, the subframe offset value is 2, and when the first subframe number is 9, the subframe offset value is 2, wherein the first subframe number is 0 or 9;

or, wherein the first subframe number is 0, 1, 5, 6, or 9, when the UL/DL configuration of the current frame structure is a configuration 6 and the processing time capability of the user is the capability of at least 3 subframes, a relationship between the first subframe number and the subframe offset value is that:

when the first subframe number is 0, the subframe offset value is 4, when the first subframe number is 1, the subframe offset value is at least one of 6 and 5, when the first subframe number is 5, the subframe offset value is 3, when the first subframe number is 6, the subframe offset value is at least one of 6 and 5, and when the first subframe number is 9, the subframe offset value is 4: or when the first subframe number is 0, the subframe offset value is at least one of 3 and 6, when the first subframe number is 1, the subframe offset value is at least one of 3 and 6, when the first subframe number is 5, the subframe offset value is 3, when the first subframe number is 6, the subframe offset value is 5, and when the first subframe number is 9, the subframe offset value is 3; or when the UL/DL configuration of the current frame structure is the configuration 6 and the processing time capability of the user is the capability of at least 2 subframes, a relationship between the first subframe number and the subframe offset value is that:

when the first subframe number is 0, the subframe offset value is at least one of 2 and 6, when the first subframe number is 1, the subframe offset value is at least one of 2 and 3, when the first subframe number is 5, the subframe offset value is 2, when the first subframe number is 6, the subframe offset value is 2, and when the first subframe number is 9, the subframe offset value is 2; or when the first subframe number is 0, the subframe offset value is at least one of 2 and 3, when the first subframe number is 1, the subframe offset value is at least one of 3 and 5, when the first subframe number is 5, the subframe offset value is 2, when the first subframe number is 6, the subframe offset value is 2, and when the first subframe number is 9, the subframe offset value is 2.

4. The transmission method according to claim 3, wherein the UL/DL configuration of the current frame structure is the configuration 0 and the processing time capability of the user is the capability of at least 3 subframes, when there is a plurality of initial subframe offset values corresponding to the first subframe number is provided, and the transmitting the uplink grant information within the reference subframe having the first subframe number comprises:

assigning a value to an uplink grant index field in the uplink grant information in accordance with the target subframe scheduled by uplink grant, to enable a mobile communication terminal to select parts or all of the plurality of initial subframe offset values as the subframe offset value in accordance with the value of the uplink grant index field in the uplink grant information, wherein the subframe offset value is configured for determining the target subframe.

5. A mobile communication terminal, comprising a processor, a memory and a transceiver, wherein the processor is configured to read a program stored in the memory to:

receive uplink grant information transmitted from a network side device;

determine a subframe offset value in accordance with a first subframe number of a reference subframe in which the uplink grant information is located, an UL/DL configuration of a current frame structure, and a processing time capability of a user, and the processing time capability of the user being a capability of at least 3 subframes or at least 2 subframes;

determine a target subframe, the target subframe being an uplink subframe and/or a special subframe, and a difference between a second subframe number of the target subframe and the first subframe number being equal to the subframe offset value; and transmit a PUSCH within the target subframe, the transceiver is configured to receive and transmit data, and the memory is configured to store therein data for the operation of the processor wherein the UL/DL configuration of the current frame structure is a configuration 0, a configuration 1, a configuration 2, a configuration 3, a configuration 4, a configuration 5, or a configuration 6, wherein the first subframe number is 0, 1, 5, or 6, when the UL/DL configuration of the current frame structure is a configuration 0 and the processing time capability of the user is the capability of at least 3 subframes, a relationship between the first subframe number and the subframe offset value is that:

when the first subframe number is 0, the subframe offset value is at least one of 3 and 4, when the first subframe number is 1, the subframe offset value is at least one of 6 and 5, when the first subframe number is 5, the subframe offset value is at least one of 3 and 4, and when the first subframe number is 6, the subframe offset value is at least one of 6 and 5; or when the first subframe number is 0, the subframe offset value is at least one of 3 and 6, when the first subframe number is 1, the subframe offset value is at least one of 3 and 6, when the first subframe number is 5, the subframe offset value is at least one of 3 and 6, and when the first subframe number is 6, the subframe offset value is at least one of 3 and 6;

or, wherein the first subframe number is 0, 1, 4, 5, 6, or 9, when the UL/DL configuration of the current frame structure is a configuration 1 and the processing time capability of the user is the capability of at least 3 subframes, a relationship between the first subframe number and the subframe offset value is that:

when the first subframe number is 0, the subframe offset value is 3, when the first subframe number is 1, the subframe offset value is 5, when the first subframe number is 4, the subframe offset value is 3, when the first subframe number is 5, the subframe offset value is 3, when the first subframe number is 6, the subframe offset value is 5, and when the first subframe number is 9, the subframe offset value is 3; or when the UL/DL configuration of the current frame structure is the configuration 1 and the processing time capability of the user is the capability of at least 2 subframes, a relationship between the first subframe number and the subframe offset value is that:

when the first subframe number is 0, the subframe offset value is 2, when the first subframe number is 1, the subframe offset value is 2, when the first subframe number is 4, the subframe offset value is 2, when the first subframe number is 5, the subframe offset value is 2, when the first subframe number is 6, the subframe offset value is 2, and when the first subframe number is 9, the subframe offset value is 2;

or, wherein when the UL/DL configuration of the current frame structure is a configuration 2 and the processing time capability of the user is the capability of at least 3 subframes, a relationship between the first subframe number and the subframe offset value is that:
when the first subframe number is 3, the subframe offset value is 3, when the first subframe number is 4, the subframe offset value is 3, when the first subframe number is 8, the subframe offset value is 3, and when the first subframe number is 9, the subframe offset value is 3, wherein the first subframe number is 3, 4, 8, or 9; or when the UL/DL configuration of the current frame structure is the configuration 2 and the processing time capability of the user is the capability of at least 2 subframes, a relationship between the first subframe number and the subframe offset value is that:
when the first subframe number is 0, the subframe offset value is 2, when the first subframe number is 4, the subframe offset value is 2, when the first subframe number is 5, the subframe offset value is 2, and when the first subframe number is 9, the subframe offset value is 2, wherein the first subframe number is 0, 4, 5, or 9;

or, wherein when the UL/DL configuration of the current frame structure is a configuration 3 and the processing time capability of the user is the capability of at least 3 subframes, a relationship between the first subframe number and the subframe offset value is that:
when the first subframe number is 0, the subframe offset value is 3, when the first subframe number is 1, the subframe offset value is 3, when the first subframe number is 8, the subframe offset value is 3, and when the first subframe number is 9, the subframe offset value is 3, wherein the first subframe number is 0, 1, 8, or 9; or when the UL/DL configuration of the current frame structure is the configuration 3 and the processing time capability of the user is the capability of at least 2 subframes, a relationship between the first subframe number and the subframe offset value is that:
when the first subframe number is 0, the subframe offset value is 2, when the first subframe number is 1, the subframe offset value is at least one of 2 and 3, and when the first subframe number is 8, the subframe offset value is 3, wherein the first subframe number is 0, 1, or 8; or when the first subframe number is 0, the subframe offset value is 2, when the first subframe number is 1, the subframe offset value is at least one of 2 and 3, and when the first subframe number is 9, the subframe offset value is 2, wherein the first subframe number is 0, 1, or 9; or when the first subframe number is 0, the subframe offset value is 3, when the first subframe number is 1, the subframe offset value is 3, when the first subframe number is 8, the subframe offset value is 3, and when the first subframe number is 9, the subframe offset value is 3, wherein the first subframe number is 0, 1, 8, or 9;

or, wherein when the UL/DL configuration of the current frame structure is a configuration 4 and the processing time capability of the user is the capability of at least 3 subframes, a relationship between the first subframe number and the subframe offset value is that:
when the first subframe number is 0, the subframe offset value is 3, when the first subframe number is 8, the subframe offset value is 3, and when the first subframe number is 9, the subframe offset value is 3, wherein the first subframe number is 0, 8, or 9; or when the UL/DL configuration of the current frame structure is the configuration 4 and the processing time capability of the user is the capability of at least 2 subframes, a relationship between the first subframe number and the subframe offset value is that:
when the first subframe number is 0, the subframe offset value is 2, when the first subframe number is 1, the subframe offset value is 2, and when the first subframe number is 9, the subframe offset value is 2. wherein the first subframe number is 0. 1. or 9;

or, wherein when the UL/DL configuration of the current frame structure is a configuration 5 and the processing time capability of the user is the capability of at least 3 subframes, a relationship between the first subframe number and the subframe offset value is that:
when the first subframe number is 8, the subframe offset value is 3, and when the first subframe number is 9, the subframe offset value is 3, wherein the first subframe number is 8 or 9; or when the UL/DL configuration of the current frame structure is the configuration 5 and the processing time capability of the user is the capability of at least 2 subframes, a relationship between the first subframe number and the subframe offset value is that:
when the first subframe number is 0, the subframe offset value is 2, and when the first subframe number is 9, the subframe offset value is 2 wherein the first subframe number is 0 or 9;

or, wherein the first subframe number is 0, 1, 5, 6, or 9,
when the UL/DL configuration of the current frame structure is a configuration 6 and the processing time capability of the user is the capability of at least 3 subframes, a relationship between the first subframe number and the subframe offset value is that:
when the first subframe number is 0, the subframe offset value is 4, when the first subframe number is 1, the subframe offset value is at least one of 6 and 5, when the first subframe number is 5, the subframe offset value is 3, when the first subframe number is 6, the subframe offset value is at least one of 6 and 5, and when the first subframe number is 9, the subframe offset value is 4; or when the first subframe number is 0, the subframe offset value is at least one of 3 and 6, when the first subframe number is 1, the subframe offset value is at least one of 3 and 6, when the first subframe number is 5, the subframe offset value is 3, when the first subframe number is 6, the subframe offset value is 5, and when the first subframe number is 9, the subframe offset value is 3; or when the UL/DL configuration of the current frame structure is the configuration 6 and the processing time capability of the user is the capability of at least 2 subframes, a relationship between the first subframe number and the subframe offset value is that:
when the first subframe number is 0, the subframe offset value is at least one of 2 and 6, when the first subframe number is 1, the subframe offset value is at least one of 2 and 3, when the first subframe number is 5, the subframe offset value is 2, when the first subframe number is 6, the subframe offset value is 2, and when the first subframe number is 9, the subframe offset value is 2; or
when the first subframe number is 0, the subframe offset value is at least one of 2 and 3, when the first subframe number is 1, the subframe offset value is at least one of 3 and 5, when the first subframe number is 5, the subframe offset value is 2, when the first subframe number is 6, the subframe offset value is 2, and when the first subframe number is 9, the subframe offset value is 2;

or,
wherein the first subframe number is 0, 1, 5, or 6, when the UL/DL configuration of the current frame structure is the configuration 0 and the processing time capability of the user is the capability of at least 2 subframes, a relationship between the first subframe number and the subframe offset value is that:
when the first subframe number is 0, the subframe offset value is at least one of 2 and 3, when the first subframe number is 1, the subframe offset value is at least one of 3 and 5, when the first subframe number is 5, the subframe offset value is at least one of 2 and 3, and when the first subframe number is 6, the subframe offset value is at least one of 3 and 5; or
when the first subframe number is 0, the subframe offset value is at least one of 2 and 6, when the first subframe number is 1, the subframe offset value is at least one of 2 and 3, when the first subframe number is 5, the subframe offset value is at least one of 2 and 6, and when the first subframe number is 6, the subframe offset value is at least one of 2 and 3.

6. The mobile communication terminal according to claim 5, wherein when the UL/DL configuration of the current frame structure is the configuration 0 and the processing time capability of the user is the capability of at least 3 subframes, a plurality of initial subframe offset values corresponding to the first subframe number is provided, and the processor is further configured to read the program stored in the memory to:
select parts or all of the plurality of initial subframe offset values as the subframe offset value in accordance with a value of an uplink grant index field in the uplink grant information.

* * * * *